United States Patent
Colasanti

[11] Patent Number: 5,190,348
[45] Date of Patent: Mar. 2, 1993

[54] SELF-INFLATING SUPPORT DEVICE INCLUDING CURVED MEMORY PLATE

[75] Inventor: Arduino Colasanti, East Detroit, Mich.

[73] Assignee: Findlay Industries, Troy, Mich.

[21] Appl. No.: 782,820

[22] Filed: Oct. 25, 1991

[51] Int. Cl.$^5$ ............................................. A47C 3/00
[52] U.S. Cl. ......................... 297/284.6; 297/DIG. 8
[58] Field of Search ......... 297/284 E, 284 C, DIG. 8; 5/441, 461, 453, 454, 450

[56] References Cited

U.S. PATENT DOCUMENTS

| | | | |
|---|---|---|---|
| 3,652,126 | 3/1972 | Folling | 297/284 E |
| 3,770,315 | 11/1973 | Smittle et al. | 297/284 E |
| 4,516,568 | 5/1985 | Baxter et al. | 297/284 E X |
| 4,516,788 | 5/1985 | Umetsu et al. | 297/284 E X |
| 4,690,456 | 9/1987 | Chiba et al. | 297/284 E |
| 5,076,643 | 12/1991 | Colasanti et al. | 297/284 E |

*Primary Examiner*—Kenneth J. Dorner
*Assistant Examiner*—James M. Gardner
*Attorney, Agent, or Firm*—Weintraub, DuRoss & Brady

[57] ABSTRACT

A self-inflating support device is described. The device has utility in various environments, particularly in seating devices deployed in motorized vehicles. The support device comprises an inflatable bladder having a release structure to control air flow. A memory plate deployed within the inflatable bladder urges the bladder to full expansion when the release structure is open. When it is desired to form the support device to the contours of a body area, the release structure is opened while the body area is reclined thereagainst. The force of reclining compresses the bladder and memory plate. Closing the release structure retains the device in the desired contour by the static air mass formed therein. Reinflation is achieved without use of a pump by the action of the memory plate. When the valve is re-opened, the memory plate expands the bladder, drawing air into the bladder through the release structure.

15 Claims, 2 Drawing Sheets

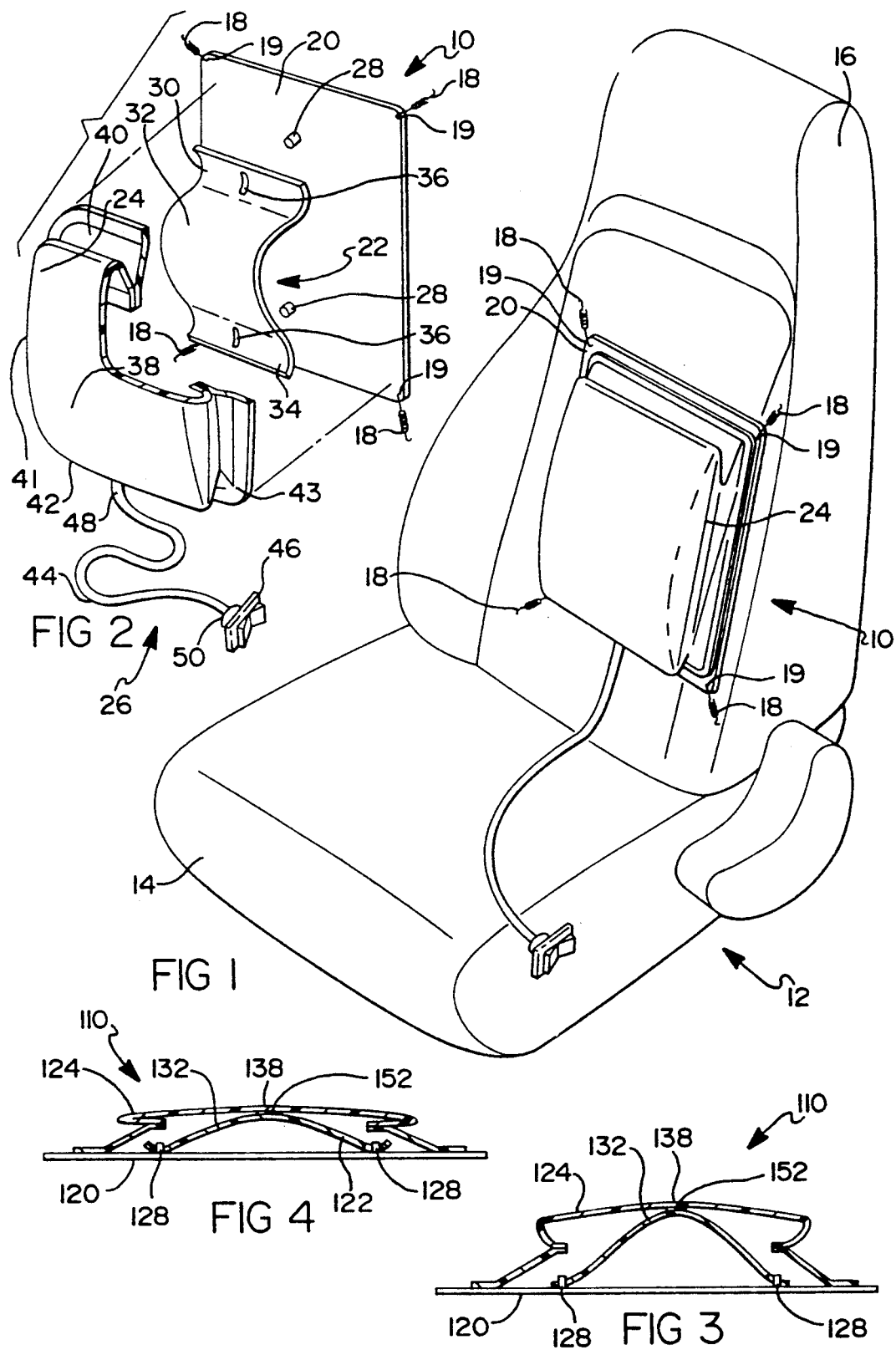

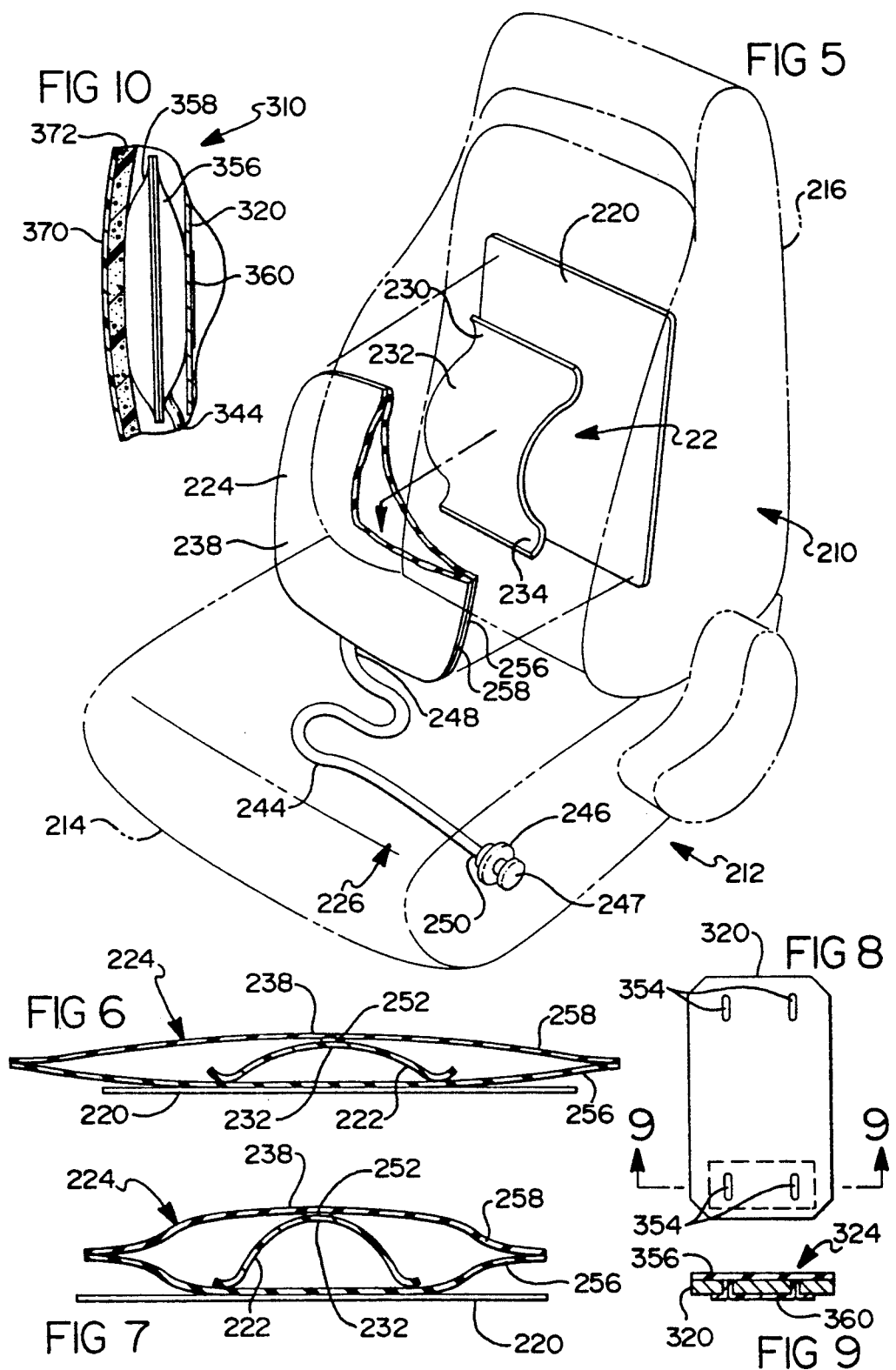

SELF-INFLATING SUPPORT DEVICE INCLUDING CURVED MEMORY PLATE

BACKGROUND OF THE INVENTION

1. Field of the Invention:

The present invention concerns a self-inflating support device. More particularly, the present invention concerns a self-inflating support device for deployment in a seating device. Even more particularly, the present invention concerns a self-inflating support device for use in an automotive seat.

2. Description of the Prior Art:

The use of inflatable pressurized supports in a chair or seating device is known. Devices currently known have a pump or similar inflating device associated therewith a expanding a bladder, or similar inflatable member, disposed within the device. Typically, the bladder of the inflatable support is molded to such a shape as to support the back of a seated person when air is introduced into the bladder. Yet, air pumps may clog and/or disfunction after repeated use, thereby necessitating expensive repair or replacement.

For example, one such typical lumbar supporting device is taught in U.S. Pat. No. 4,516,568, issued May 14, 1985 to Baxter et al. Baxter teaches a lumbar and sacroiliac support comprising a resilient wedge-shaped member and a modified U-shaped air bladder which is filled to a selected air pressure in a uniform manner. The air bladder is filled with air by a hand-operated pump which is equipped with a release valve. This not only requires manual pumping, but also presents the potential of pump or valve malfunction.

What is needed is a self-inflating support device, thereby eliminating the necessity of a pump or other inflating means. It is to this to which the present invention is directed.

SUMMARY OF THE INVENTION

The present invention in a first aspect is a self-inflating support device generally comprising:

(a) a mounting plate;

(b) a memory plate mounted upon the mounting plate;

(c) an inflatable bladder sealed onto the mounting plate, the bladder having an interior, the bladder encompassing the memory plate within the interior thereof; and (d) means for regulating air flow to the bladder.

The present device may further comprise a connector joining the bladder and the memory plate.

In a preferred embodiment, the means for regulating comprises:

(a) an elongated fluid delivery tube having first and second ends, the first end connected to the bladder and in fluid communication with the interior of the bladder, the tube channeling air flow thereinto; and, (b) a valve disposed on the second end of the tube, the valve controlling the air flow through the tube.

Ideally, the support device is deployed such that it supports the back region or other desired area, such as the legs, of a user.

The present invention may be deployed in a variety of environments, particularly the passenger compartment of a motor vehicle. Thus, a second aspect hereof is a seating device and, in particular, an automotive seating device having the self-inflating support device hereof incorporated therein.

Other advantages and features will be more clearly seen by reference to the drawings, wherein like reference numbers refer to like parts in the various drawings.

BRIEF DESCRIPTION OF THE DRAWINGS

FIG. 1 is a perspective view of a seating device which includes a first embodiment of the support device of the present invention;

FIG. 2 is an exploded view of the first embodiment of the support device of the present invention;

FIG. 3 is a side view of a second embodiment of the support device hereof, and being shown in a inflated state;

FIG. 4 is a side view of the second embodiment of FIG. 3, but being shown in an deflated state;

FIG. 5 is an exploded view of a third embodiment of the support device of the present invention;

FIG. 6 is a side view of the third embodiment of the support device hereof, and being shown in a deflated state;

FIG. 7 is a side view of the third embodiment of FIG. 6, but being shown in an inflated state;

FIG. 8 is a top plan view of a mounting plate of a fourth embodiment of the support device of the present invention;

FIG. 9 is a cross-sectional view of the mounting plate of the fourth embodiment of the support device, taken along the line I—I; and FIG. 10 is a side view partially in cross-section of the fourth embodiment of the support device deployed in a seating device.

DETAILED DESCRIPTION OF THE PREFERRED EMBODIMENTS

Referring now to FIGS. 1 and 2 there is shown a first embodiment of a support device 10 in accordance with the present invention. The device 10 is shown as disposed within a seating device 12. The seating device 12 comprises a lower portion 14 and a back portion 16.

The support device 10 in the preferred embodiment hereof is deployed in the back portion 16 of the seating device 12. Of course, if desired, the support device can be deployed in the lower portion 14. Likewise, there could be one device in the lower portion and one in the back portion of the seating device.

It is to be understood that the support device 10 can be deployed in a variety of locations and environments, as desired, and is not limited to the embodiments depicted and described herein. One particularly suitable location for the support device 10 hereof is in the seating devices of a motor vehicle.

As shown in FIG. 2, the support device 10 comprises a mounting plate 20, a memory plate 22, a bladder 24 and means 26 for regulating air flow, each of which will be discussed in further detail herein.

The mounting plate 20 is a generally flat member, formed of a suitable, sturdy material e.g., such as metal or a tough durable plastic. A plurality of pegs 28 are integrally formed onto the mounting plate 20 and extend outwardly therefrom, as shown. As will be described herein, in the first embodiment 10, the mounting plate 20 serves as a base and stabilizer for the support device 10. Other elements of the support device, such as the memory plate 22 and the inflatable bladder 24, are joined to the mounting plate 20. The sturdy nature of the mounting plate 20 helps support and facilitate the expansion and contraction of the support device 10.

The memory plate 22 is formed of a flexible material, such as a flexible spring metal, a strong resilient plastic, or the like, to enable movement thereof responsive to forces applied by a person seated on the seating device 12. The memory plate 22 tends to act in a spring-like manner and attempt to return to a preferred orientation thereof. The memory plate 22 has an upper end 30, a middle portion 32 and a lower end 34. The memory plate 22 is bowed, such that the middle portion 32 extends outwardly relative to the ends 30, 34. A plurality of holes 36 are formed in the ends 30, 34 of the memory plate 22. The holes 36 of the memory plate 22 correspond to the pegs 28 of the mounting plate 20. The pegs 28 are received into the holes 36. The pegs 28 retain the memory plate 22 in position on the mounting plate 20. This deployment allows the depression of the middle portion 32 of the memory plate 22 towards the mounting plate 20 when a force is applied against the memory plate 22. The memory plate 22 will then bend away from the mounting plate 20 when the force is removed. Thus, the memory plate 22 provides a means for pressing outwardly within the support device 10.

The bladder 24, as seen in FIG. 2, is a collapsible member, made of a suitably flexible material. The bladder 24 has a front panel 38 and a plurality of collapsible sides, shown as 40, 41, 42 and 43. The rear panel of the bladder 24 is open in the first embodiment 10. The bladder 24 may therefore be placed onto the mounting plate 20 such that the memory plate 22 is totally encompassed within the interior of the bladder 24. The bladder 24 is then air-tightly sealed to the mounting plate 20. Any suitable means commonly known, such as sonic welding or gluing, may be used. A preferred means will be discussed herein below in regards to the fourth embodiment.

The bladder 24 may be thus formed substantially to the contour of whatever presses against it. The method of enclosing the memory plate 22 within the bladder 24 permits the bladder 24 to be self-inflating without the need of a pump or similar inflating means. The memory plate 22, thus, serves as a means for expanding the bladder 24 when reinflation is desired.

The means 26 for regulating air flow is connected to the bladder 24. As shown in FIG. 2, the means 26 for regulating air flow comprises a tube 44 and a valve 46.

The tube 44 is formed of rubber, plastic or other suitable, flexible material. The tube 44 has a first end 48 and a second end 50. The first end 48 of the tube 44 is connected to the bladder 24, such that the interior of the bladder 24 is in fluid communication with the interior of the tube 44.

The valve 46 is deployed at the second end 50 of the tube 44. The valve 46 comprises a plug-cock valve, which is commonly known in the art. Other similar valve designs may be used. The valve 46 as shown in FIGS. 1 and 2 is a valve having three settings, for closed, partial open and fully open.

The valve 46 ands tube 44 permit or prevent air from flowing between the bladder 24 and the environment surrounding the seating device 12. When the valve 46 is closed, a sealed air mass is trapped within the bladder 24. This gives the bladder 24 firmness and the ability to support a person inclined thereon. It also sets nonpermanently the contour formed in the bladder 24 by the person reclining against the support device 10. When the valve 46 is opened, air is drawn in the tube 44 by the expansion of the bladder 24, due to the spring action of the memory plate 22. Thus, reinflation without a pump is achieved.

The functioning of the support device 10 will now be described. When no external pressure is exerted by a user upon the device 10 disposed in the seating device 12, with the valve 46 opened, air may freely flow into or out of the bladder 24. Normally, when the valve 46 is opened, the memory plate 22 will press outwardly on the bladder 24 by virtue of its curved shape and resilient spring-like construction. This outward pressure will have a tendency to inflate the device 10, if no countervailing pressure is applied, to the point where the memory plate 22 reaches a stable orientation thereof, at which point it will be fully extended. The front end 38 of the bladder 24 will be resting upon, or be elevated slightly above, the middle portion 32 of the memory plate 22. This is the rest position.

The application of external pressure onto the support device 10, such as by a person seated on the seating device 12 and reclining against the back portion 16, while the valve 46 is open, forces the front panel 38 of the bladder 24 and the middle portion 32 of the memory plate 22 towards the mounting plate 20. This action compresses the bladder 24, reducing the interior volume thereof. Air is then pushed out of the bladder 24, into the tube 44, out through the valve 46, and into the surrounding atmosphere. This process continues until the person seated on the seating device 12 has fully reclined, thus exerting no additional force upon the support device 10. The person then closes the valve 46. The bladder 24 will, by virtue of reclining, have been conformed to the shape of the area which exerted the force, here generally the lumbar region. The closing of the valve 46 restricts air flow and prevents reexpansion of the bladder 24.

When either a different configuration or reexpansion of the support device 10 is desired, the person seated on the seating device 12 must open the valve 46 and remove any force exerted upon device 10. The memory plate 22 then presses away from the mounting plate 20 to reassume its former rest position. The movement of the memory plate 22 forces the front end panel 38 of the bladder 24 away from the mounting plate 20. This increases the volume of the interior of the bladder 24. Air required to fill this volume is drawn through the open valve 46, into the tube 44 and into the bladder 24. Thus, without the aid of a pump or similar means, the support device 10 is reinflated.

As was previously discussed heretofore, seating devices 12, generally, have lower portions 14 and back portions 16. These devices 12 contain structures such as frames (not shown), surrounded by foam or other suitable cushioning material (not shown). The foam is enclosed by a covering (not shown). The support device 10 may be deployed within the seating device 12 in different ways. Firstly, the device 10 can be placed forward of the foam, directly behind the covering. This is possible due to the bladder 24 having no rigid member before it. Alternately, the device 10 may be placed behind the foam, as this material will not inhibit the operation of the device 10.

The support device 10 may, if desired, be attached to the frame or other structure for stability by means for attaching. As shown in FIG. 1, the means for attaching may, optionally, comprise a plurality of springs 18. The springs 18 are hooked to the mounting plate 20, seated in a plurality of apertures 19 which are formed in the mounting plate 20. The means for attaching can alternately comprise straps, bands or other fasteners known to those in the relevant art.

Alternately, the support device 10 need not be attached to a frame in the seating device 12. The support device 10 may be positioned where desired in the seating device 12, whether in the lower portion 14 or in the back portion 16, by packing foam therearound. Thus, location of the device is not restricted to the bounds of the frame. It is required in this situation, however, that the foam disposed behind the mounting plate of the support device 10, prohibits shifting of the device 10. With firm backing, proper functioning of the support device 10 is assured.

It is normally found in seating devices 12, and particularly seating devices deployed in an automobile, that a certain measure of foam is attached to the covering of the device 12. This foam is normally sewn or otherwise attached to the covering to give some substance and backing to the covering, or possibly for a design to be embroidered or imprinted thereon, It is anticipated and preferred that the support device 10 of the present invention would be deployed directly behind this covering with foam. As heretofore previously discussed, however, the present invention can also operate in different surrounding in other seating devices.

With reference now to FIGS. 3 and 4, a second embodiment of the present invention is shown. The second embodiment, generally indicated at 110, is substantially similar to the first embodiment 10 of the present invention. That is, the second embodiment of the support device 110 comprises a mounting plate 120, a memory plate 122, a bladder 124 and means for regulating air flow, each of which is consistent with the disclosure of the first embodiment.

The second embodiment of the support device 110 further comprises a connector 152. The connector 152 is, preferably, made of vulcanized rubber. It can, however, be formed of any other suitable material, such as, e.g., a flexible plastic or elastomer.

The connector 152 is affixed to the interior surface of the front panel 138 of the bladder 124 and to the middle portion 132 of the memory plate 122. The connector 152 joins the bladder 124 and the memory plate 122. Thus, the movement of these members 122, 124 of the support device 110 is coordinated when expansion or compression occurs.

Referring now to FIGS. 5-7, there is shown a third embodiment of the support device 210 in accordance with the present invention. The third embodiment of the support device 210 is substantially similar to the first embodiment 10 and the second embodiment 110 of the present invention, that is, the third embodiment of the support device 210 comprises a mounting plate 220, a memory plate 222, a bladder 224 and means 226 for regulating air flow.

The memory plate 220 is, as in the previous embodiments, a sturdy solid member made of a lightweight material, such as durable plastic or metal. Unlike the previous embodiments, the mounting plate 220 of the third embodiment does not have a plurality of pegs formed thereon.

The memory plate 222 is a solid member, not having any apertures formed therein, unlike the previous embodiments. In all other features, the memory plate 222 is identical to the memory plates of previous embodiments.

The bladder 224 is formed of two mountable pieces, a lower portion 256 and an upper portion 258. The lower portion 256 is in flush contact with the mounting plate 220 and adhered to the mounting plate 220 by gluing.

The memory plate 222 is deployed on top of the lower portion 256 of the bladder 224. The upper portion 258 of the bladder 224 is then deployed atop the memory plate 222. The center panel 238 of the upper portion 258 is attached to the middle portion 232 of the memory plate 222 by means of a connector 252. Ideally, the connector 252 is vulcanized rubber connected between the memory plate 222 and the bladder 224 to permanently join these pieces. However, any similar means may be employed. After the memory plate 222 and the bladder 224 have been connected, the lower portion 256 and the upper portion 258 of the bladder 224 are sealed together, effecting an airtight seal. The portions 256, 258 may be vulcanized, sonic welded or otherwise bonded together, as is known in the art.

The means 226 for regulating air flow is connected in fluid communication to the interior of the bladder 224. The means 226 for regulating air flow comprises a tube 244 and a valve 246. The tube 244 is similar to those tubes described in the previous embodiments.

The valve 246 is a push button valve, such that the valve is closed when the button 247 is in the rest or unpressed position. When the button 247 of the valve 246 is depressed, the valve 247 is open, connecting the tube 244 with the environment surrounding the seating device 212. When the button 247 of the valve 246 is depressed, air may enter or exit the support device 210, as desired by the user.

Unlike the first and second embodiments, where the bladder 24 and 124 was formed in a bellows or accordion shape, the bladder 224 of the third embodiment is found in a pillow shape, with no folds formed therein.

In all other aspects not herein described, the third embodiment is identical with the previous embodiments described hereinabove.

Although the present invention has been defined and discussed in a seating environment and, generally, as a lumbar support, the device 10 can be deployed in a variety of environments to support various body parts.

With reference now to FIGS. 8-10, there is shown therein a fourth embodiment of the present invention, showing a self-inflating support device 310. As can be seen in FIG. 10, the device 10 is deployed in a seating device, where a covering 370 and a plurality of foam 372 is deployed above the device 310. This is as would normally be expected in a seating device of an automobile.

As can be seen in FIGS. 8 and 9, a mounting plate 320 is shown, having a plurality of slots 354 formed therein. The slots 354 facilitate the mounting of the bladder 324 thereon. Specifically, the lower portion 356 is disposed upon a first or front side of the mounting plate 320, and adhered to the mounting plate 220 by gluing sonic welding, heat pressing or other similar means.

Alternatively, and as shown in FIG. 9, a lower panel 356 of the bladder 324 which may be substantially identical to the pillow-shaped bladder 224 of the third embodiment, is disposed atop the slotted mounting plate 320. A sealing sheet 360 is disposed below the mounting plate 320 opposite the lower panel 356 of the bladder 324. The sealing sheet is then pressed through the slots 354 of the mounting plate 320 and is fused to the lower panel 356 of the bladder 324 by suitable adhesives or by the application of heat thereto. This serves to then hold the bladder in place on the mounting plate 320. It has been found that a quick and cost efficient method of joining is to vulcanize the sealing sheet 360 through the mounting plate 320 to the lower portion 356 of the bladder 324.

In all other aspects, the device 310 of the fourth embodiment is substantially similar to the third embodiment.

Having, thus, described, the invention, what is claimed is:

1. A self-inflating support device comprising:
   (a) a mounting plate;
   (b) a curved memory plate mounted upon the mounting plate, being formed of a flexible material and having an upper end, a middle portion and a lower end, the middle portion upwardly curved relative to the upper end and the lower end;
   (c) a bladder sealed onto the mounting plate, the bladder having an interior and encompassing the memory plate within the interior thereof; and
   (d) means for regulating air flow, the means for regulating being connected to the bladder.

2. The support device of claim 1 further comprising: a connector joining the bladder and the middle portion of the memory plate.

3. The support device of claim 1, wherein the means for regulating comprises:
   (a) an elongated fluid delivery tube having first and second ends, the first end connected to the bladder and in fluid communication with the interior of the bladder, the tube channeling the air flow into and out of the bladder; and
   (b) a valve disposed at the second end of the tube, the valve controlling the air flow of the tube.

4. The support device of claim 1, wherein the support device is deployed in a seating device.

5. The support device of claim 1, wherein the support device supports the lumbar region of a person.

6. The support device of claim 4 further comprising means for attachment, the means for attachment joining the support device to the seating device.

7. The support device of claim 4, wherein the device is deployed without attachment to a frame in the seating device.

8. The support device of claim 4, the seating device having a frame, a plurality of foam surrounding the frame and a covering encompassing the foam around the frame;
   wherein the support device is deployed directly beneath the covering, the support device being disposed within and supported by the foam of the seating device.

9. A self-inflating device comprising:
   (a) a mounting plate;
   (b) a bladder connected to the mounting plate;
   (c) a curved memory plate disposed within the bladder, the memory plate having an upper end, a middle portion and a lower end, the middle portion upwardly curved relative to the upper end and the lower end; and
   (d) means for regulating air flow, the means for regulating being connected to the bladder.

10. The support device of claim 9, further comprising:
    a connector joining a front panel of the bladder to the middle portion of the memory plate.

11. The support device of claim 9, wherein the means for regulating comprises:
    (a) a fluid delivery tube having first and second ends, the first end connected to the bladder and the tube being in fluid communication with the interior of the bladder, the tube channeling the air flow into and out of the bladder; and
    (b) a valve disposed at the second end of the tube, the valve controlling the air flow of the tube.

12. The support device of claim 9, wherein the mounting plate has a plurality of slots formed therein, the device further comprising:
    a sealing sheet disposed behind the mounting plate, wherein the sealing sheet is connected to the bladder and retains the bladder to the mounting plate.

13. The support device of claim 9, wherein the bladder is pillow shaped.

14. The support device of claim 9, wherein the bladder is bellows-shaped and having at least one fold therein.

15. The support device of claim 1, wherein the mounting plate has a plurality of pegs disposed thereon and the memory plate has a plurality of apertures formed therein;
    wherein the memory plate is fitted into the mounting plate and retained thereby.

* * * * *